United States Patent [19]

Morganstein

[11] Patent Number: 5,027,384

[45] Date of Patent: Jun. 25, 1991

[54] PERSONALIZED AUTOMATIC CALL ROUTING

[75] Inventor: Sanford J. Morganstein, Elgin, Ill.

[73] Assignee: Dytel Corporation, Schumburg, Ill.

[21] Appl. No.: 217,426

[22] Filed: Jul. 11, 1988

Related U.S. Application Data

[63] Continuation-in-part of Ser. No. 909,755, Sep. 26, 1986, Pat. No. 4,809,321.

[51] Int. Cl.$^5$ ............................................. H04M 3/54
[52] U.S. Cl. .................................... 379/67; 379/211; 379/89; 379/212
[58] Field of Search ............... 379/211, 213, 214, 212, 379/210, 88, 89, 67, 194

[56] References Cited

U.S. PATENT DOCUMENTS

| | | | |
|---|---|---|---|
| 3,931,476 | 1/1976 | Matthews | 379/22 |
| 3,965,595 | 5/1976 | Sobanski | 379/ |
| 4,313,035 | 1/1982 | Jordan et al. | 379/207 |
| 4,436,962 | 3/1984 | Davis et al. | 379/214 |
| 4,625,081 | 11/1986 | Lotito et al. | 379/214 |
| 4,696,028 | 9/1987 | Morganstein | 379/213 |
| 4,809,321 | 2/1989 | Morganstein et al. | 379/210 X |

FOREIGN PATENT DOCUMENTS

| | | |
|---|---|---|
| 90663 | 7/1981 | Japan . |
| 0096447 | 6/1983 | Japan . |
| 121865 | 5/1986 | Japan . |

OTHER PUBLICATIONS

Panasonic Operating Instructions for the Integrated Telephone System Model No. KX-T2345.

*Primary Examiner*—James L. Dwyer

[57] ABSTRACT

A user programmable telecommunication system for allowing calling parties to select optional call completion destinations during busy and no-answer status conditions. A telephone user can program the system to provide personalized voice responses to calling parties in response to busy and no-answer conditions. In addition, the voice prompts include one or more alternate destinations for assisting the calling party in completing the call. The telephone user preprograms the communication system for defining the alternate destinations so that the calling party is provided with a high likelihood of completing the call to a best possible destination under the circumstance.

45 Claims, 4 Drawing Sheets

PERSONALIZED AUTOMATIC CALL ROUTING

RELATED APPLICATIONS

This application is a Continuation-in-Part of "Busy/-No-Answer Call Completion Equipment," by Morganstein et al., Ser. No. 909,755, Filed Sept. 22, 1986, now U.S. Pat. No. 4,809,321.

"AUTOMATED CALL SCREENING", by Morganstein, Ser. No. 07/217,179, filed concurrently herewith.

TECHNICAL FIELD OF THE INVENTION

The present invention relates in general to telecommunications apparatus and methods, and more particularly relates to a call processing technique for improving the completion of telephone calls so that calling parties can be connected to alternate destinations, as preprogrammed by a called party, in response to a busy or no-answer status of the called party.

BACKGROUND OF THE INVENTION

In order to conduct a business of any size in today's commercial environment, it is necessary to utilize telecommunication equipment on a daily basis. Thus, it comes as no surprise that the telecommunication needs of a business grow generally in direct correspondence with the business activity thereof.

An important aspect in communicating with others, especially by telephone, is that the call be completed promptly and directly to the desired party. However, as the business activity of a person increases, the probability of completing a call to such person decreases. As a result, the calling party is often confronted with a busy signal, in which event either a subsequent call must be made or a message left with an attendant or secretary. Great strides have been made in the telecommunications industry, and especially in connection with call processing, for facilitating and expediting the completion of calls. Disclosed in U.S. Pat. No. 4,696,028, by Morganstein et al., and assigned to Dytel Corporation, is a technique for expediting incoming calls directly to telephone sets connected to an associated switching system. Another call processing feature for facilitating telephone communications, by way of voice messaging, relates to voice store and forward techniques, as disclosed in U.S. Pat. No. 3,931,476, by Matthews.

Generally, any options in completing calls to a busy telephone set are left with the calling party. Uncompleted telephone calls of the noted type, as well as cases in which the called party does not answer, result in either a delayed communication, or no communication at all, depending on the urgency of the situation. It can be appreciated that important economic and commercial ramifications may result from uncompleted telephone calls, such as the loss of business, the loss of time, and in many cases the frustration of the calling party which may be detrimental to business relations. This is highly significant, especially if the call could have been completed directly to another party who could provide the necessary assistance or information to the calling party.

From the foregoing, it can be seen that a need exists for a call processing technique which facilitates the completion of telephone calls during busy and no-answer conditions of the called party. There is an associated need for providing telecommunication methods and apparatus for allowing the called party to provide personalized call routing of incoming telephone calls, in the event the destination telephone set is busy or is not answered.

SUMMARY OF THE INVENTION

In accordance with the present invention, the disclosed call processing technique substantially reduces or eliminates the disadvantages and shortcomings associated with prior art techniques. According to the invention, a processor-controlled telecommunication system is provided with facilities for allowing a user thereof to preprogram the communication system to respond to busy and no-answer signals and yet complete an incoming call to the best alternate destination, based upon a choice made by the called party. Indeed, the disclosed invention permits the telephone set user to preprogram the communication system to provide a personalized response and carry out a specified call route in the case of a busy situation or a no-answer situation. The system is programmable as well for other cases, such as in completing general incoming calls in a specified manner to the called party.

In accordance with the preferred embodiment of the invention, the communication system is preprogrammable by the telephone user to provide an initial greeting to all incoming calls which identifies the called party by name. In such case, the call can be completed either by ringing the called party's telephone set, or by connecting the calling party to voice store and forward facilities, both such options being at the calling party's discretion.

Also preprogrammable in advance by the telephone set user is the call route to be taken when his or her telephone is busy. In this situation, the telephone user can preprogram the communication system to respond to the calling party by identifying the called party and issuing a statement as to the busy condition. In addition, the personalized message gives vocal prompts to the calling party as to other options which may be taken and the number to be dialed by the calling party to select the option which is best suited to communicate or to complete the transaction. The options programmable according to the preferred form of the invention include the option to hold, receive digits for routing the call to an alternate destination, or simply to dial digits of any other desired destination, and lastly, to direct the communication system to a default destination if no digits are dialed. The communication system can be preprogrammed to respond to a no-answer situation by transmitting a personalized message to the calling party identifying the called party and indicating that such party is unavailable. As with the busy situation, the calling party can be apprised by a verbal prompt of an alternate destination at which the called party may presently be available, or other destination which may be selected by the calling party.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts or functions throughout the views, and in which.

DETAILED DESCRIPTION OF THE INVENTION

Figure 1:
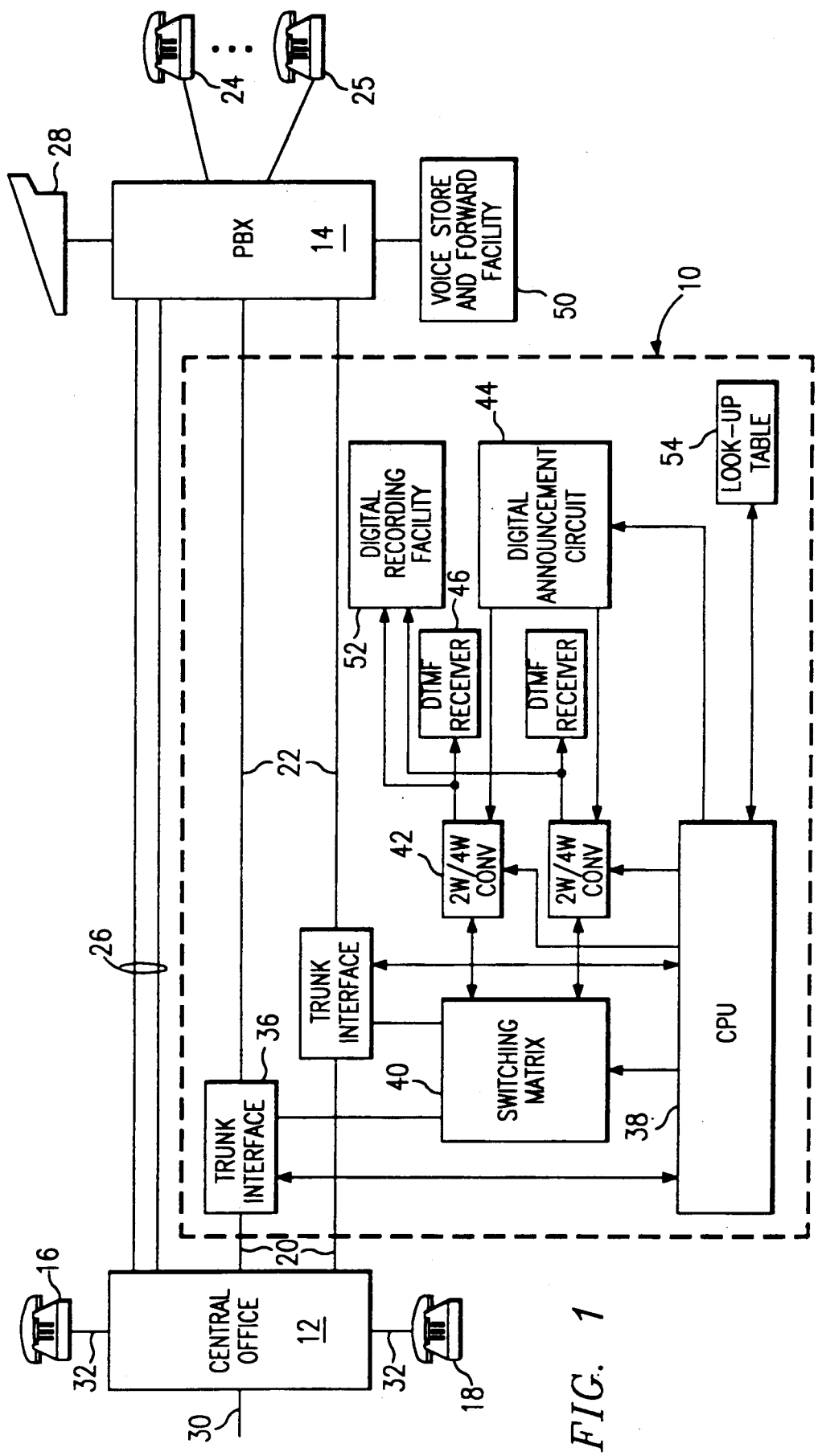
FIG. 1 illustrates, in block form, an exemplary call processor and associated switching system for carrying out the features and advantages of the invention.
Figure 2A:
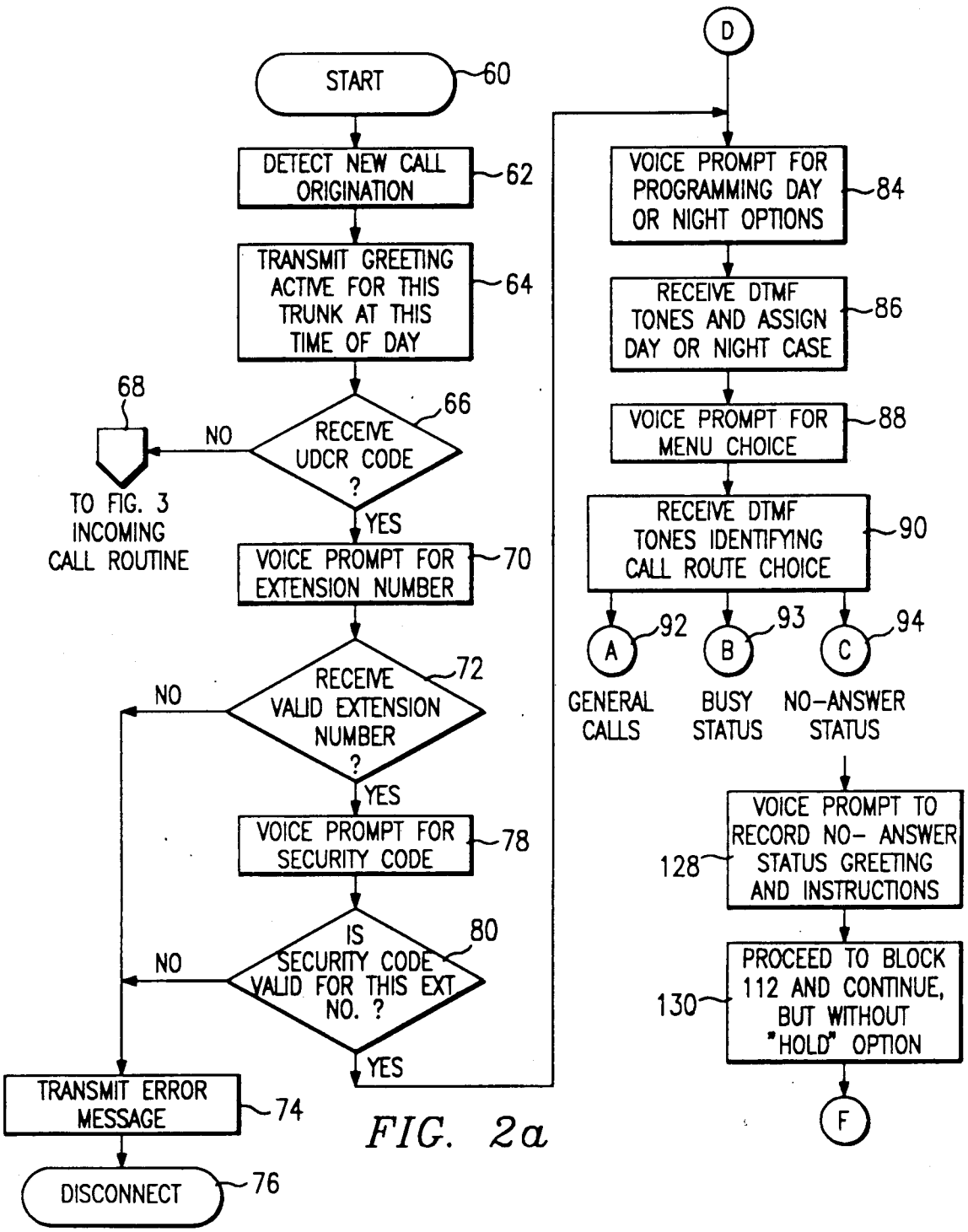
FIGS. 2a and 2b are program flow charts illustrating the functions of a call processor programmed according to the invention.
Figure 2B:
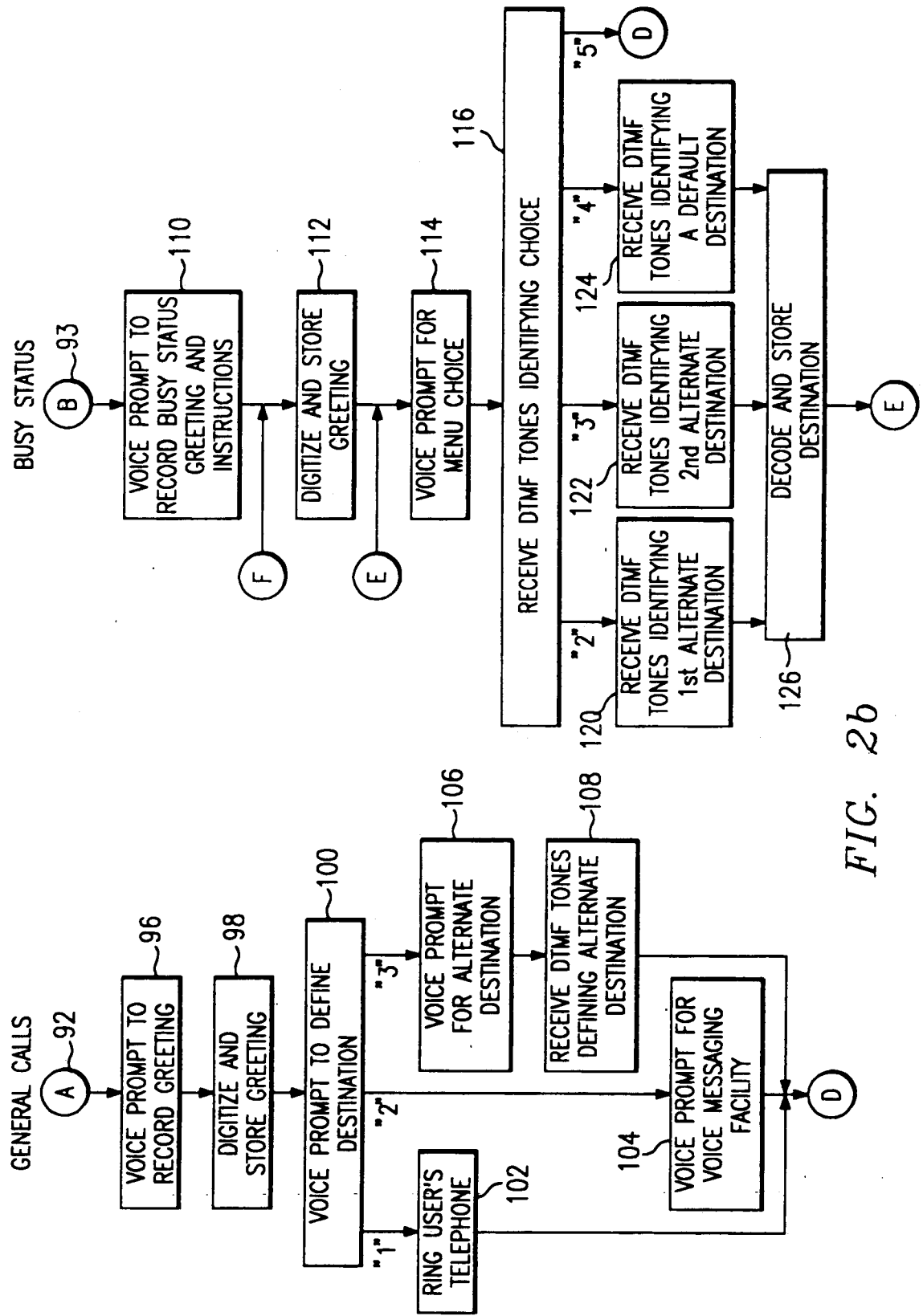
Figure 3:
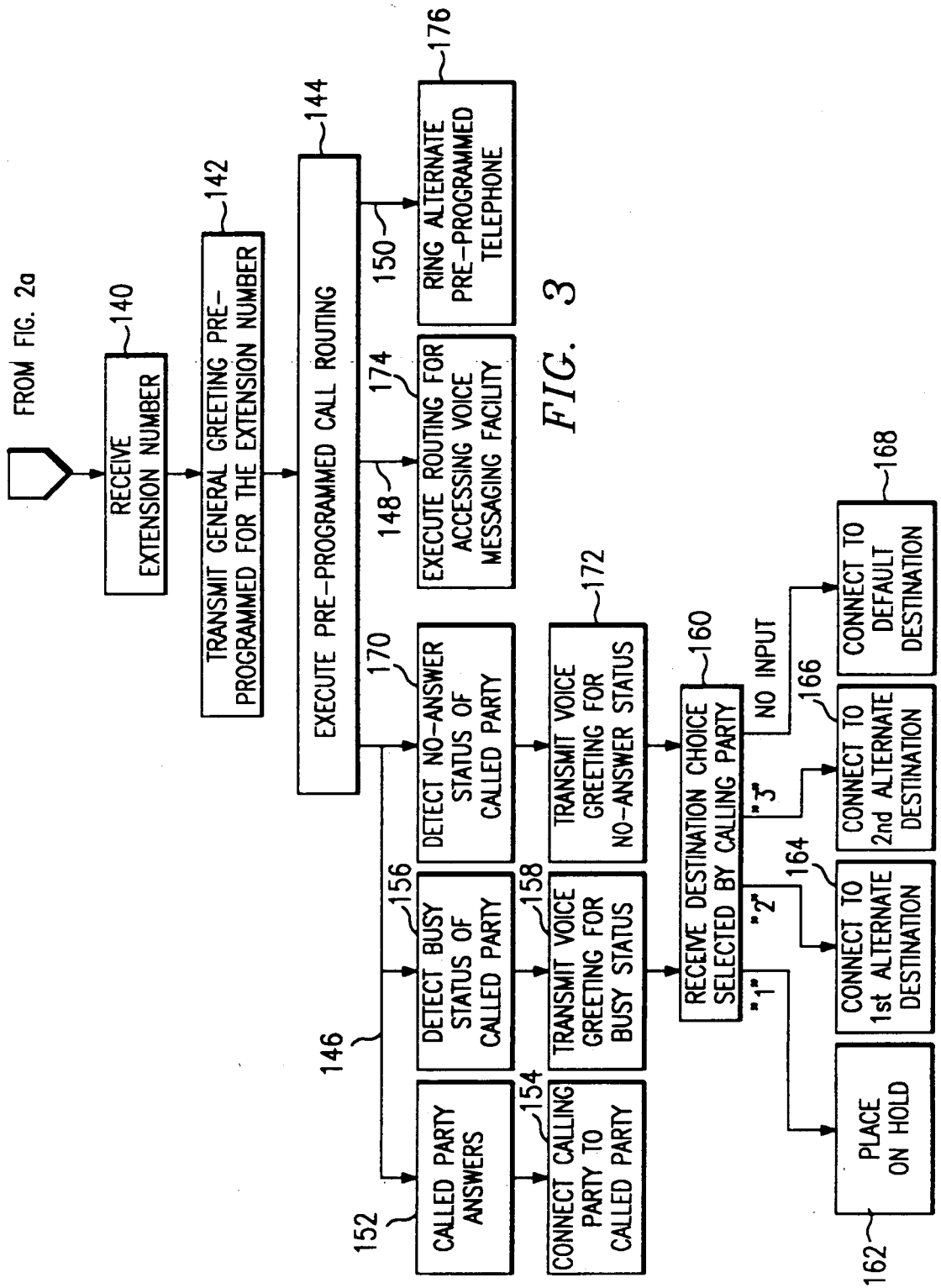
FIG. 3 is a program flow chart of an exemplary incoming call which is completed in accordance with the invention.

FIGS. 1-3 illustrate a call processing technique which may be implemented in many types of telecommunications switching systems for facilitating the completions of telephone calls.

FIG. 1 shows an exemplary environment in which the present invention may be advantageously practiced. Particularly, shown is a call processor 10 which functions to complete telephone calls directed from a local central office 12 to a telecommunication switching system 14. The switching system 14 is depicted as private branch exchange (PBX) type of on-premises switching equipment; however, other switching systems such as key telephone systems, ACDs, etc., may be employed as well. Indeed, those skilled in the art may find that the call processor 10 can be adapted to function in cooperation with the on-premises switching system 14 without direct connection to the central office 12 and may even integrate the call processor functions within the on-premises switching system 14.

While FIG. 1 illustrates the call processor 10 operating in conjunction with an on-premises switching system 14, the principles and concepts of the call processor 10 may also be integrated within the central office switching system 12. The depicted local central office 12 is of the type which itself services a number of telephone sets 16 and 18.

With particular reference now to FIG. 1, the call processor 10 is shown connected on inputs thereof to the central office 12 by one or more incoming trunks 20, and connected on outputs thereof to the PBX 14 by a corresponding number of subscriber lines 22. Incoming calls from the central office 12 are therefore directed to the telephone sets 24 and 25 of the PBX 14, via the call processor 10 of the invention. Outgoing calls originating from the PBX telephone sets 24 or 25 are directed to the central office 12, via a number of outgoing trunks 26. The PBX 14 may be of the unattended type, or be provided with a switchboard attendant 28. The central office 12 may be of the type well known in the art for providing telecommunication services to subscribers 16 and 18 connected thereto, as well as for switching telephone calls to other central offices (not shown) by way of one or more interoffice trunks 30.

Conventional calls are directed to the PBX 14 by way of the call processor 10 in the following manner. In response to an incoming call from a local telephone subscriber using telephone sets 16 or 18, or from a more distant calling party (not shown), the central office 12 transmits ringing signals on the incoming trunks 20 to a trunk interface 36 in the call processor 10. A CPU 38, which is connected to the plural trunk interfaces, detects the ringing signals and connects the particular trunk interface 36, via a switching matrix 40 to an idle two-wire to four-wire converter 42, commonly known as a hybrid. The CPU 38 is also effective to select a greeting message in a digital announcement circuit 44 for transmittal through the hybrid 42, the switching matrix 40, the trunk interface 36, and the central office 12 to the calling party. Of course, the CPU 38 also trips the central office ringing so that the calling party can listen to the greeting message. In response to the greeting, the calling party is instructed to input the telephone extension number of the telephone 24 or 25 associated with the called party. The input of the extension number digits from the caller's DTMF-type telephone set is decoded by a DTMF receiver 46 and temporarily stored in the CPU 38 in digital form. The CPU 38 then provides an off-hook condition to one of the subscriber lines 22 connected to the trunk interface 36.

The on-premises switching system 14 responds to such off-hook condition by sending dial tone on the subscriber line 22, whereupon the CPU outputs the stored digits in DTMF form to the on-premises switching system 14. The on-premises switching system 14 then effects a connection between the subscriber line 22 and the selected one of the telephone set 24 or 25 associated with the called party. In like manner, the CPU 38 of the call processor 10 provides a cut-through in the trunk interface 36 between the incoming trunk 20 and the subscriber line 22, thereby providing an overall communication path between the calling party and the called telephone set 24 or 25. The call processor 10 is described in more detail in U.S. Pat. No. 4,696,028, the subject matter of which is incorporated in its entirety herein by reference.

Briefly summarized, the present invention allows a telephone user associated with the on-premises switching system 14 to program the call processor 10 to direct either general incoming calls to his or her telephone set to various destinations, or to preprogram destinations depending on the busy or no-answer status of the called party's telephone. Such destinations may comprise the switchboard attendant 28, an alternate destination such as a secretary of the telephone user, or a voice store and forward facility 50. Voice store and forward facilities may be employed, such as the type disclosed in U.S. Pat. No. 3,931,476, by Matthews. Of course, many other destinations or alternate facilities may be employed for routing the incoming calls. Shown also is a digital recording facility 52 for storing, in digital form, voice text input into the call processor 10 by the telephone user of the on-premises switching system 14. The programming of the call processor 10 by the user thereof is accomplished using a plurality of look-up tables 54, each of which cross-references various numerical indicators to other data, all to be described below.

A telephone user, for example, Mr. Jones, may desire to program the call processor 10 such that all general incoming calls are directed to predefined destinations. Mr. Jones can also program the routing of incoming calls to predefined destinations if his telephone set is busy, or if he is not able to answer his telephone.

Having described the apparatus of the call processor 10, and the basic operations thereof, reference is now made to FIG. 2a where there is illustrated the major steps for achieving the features and advantages of the present invention. Program block 60 illustrates the start of the preprogramming procedure which may be, for example, a processor loop in which the CPU 38 waits for the origination of new telephone calls to the switching system 14. A user of the switching system 14 may access the call processor 10 by seizing the outgoing trunk 26, and dialing the directory number of the business entity associated with the switching system 14. Access to other types of call processors, whether or not integrated directly into the switching systems can be completed by well-known techniques or procedures.

Program block 62 illustrates the detection of a new call origination by the call processor 10, such as a ringing signal transmitted on an incoming trunk 20 by the local office 12. In response to the ringing signal, ringing is tripped, and a greeting is transmitted at block 64 to the telephone user-programmer, which greeting is active for the particular trunk and/or time of day. In other words, certain greetings may be transmitted to the calling parties depending on holidays, business hours, after hours, weekends, etc. In addition, the greeting identifies the business entity associated with the switching system 14, and includes a verbal prompt to input an extension number or other digits representative of a destination party. It is understood that the call processor 10 includes facilities for receiving DTMF tones representative of the digits input by the user-programmer subsequent to the greeting and analyzing such digits as to the content thereof. Various look-up tables 54 may be utilized to ascertain that the dialed digits are valid, and indeed represent either an extension number associated with the switching system 14 or a program mode in which the call processor 10 can enter.

In addition, look-up tables 54 may be employed to store codes which may be known only to the users of the switching system 14. One such code may be predefined as a user defined call routing (UDCR) code to signal the call processor 10 to enter a user programming routine. Such a routine allows the user-programmer to preprogram the system according to a called party's choice of call routing for busy and no-answer calls to his or her telephone set. Such a UDCR code may be, for example, "**7", which is known generally to the users of the switching system 14.

The UDCR code is input by the user-programmer, in lieu of the extension number solicited by the voice instruction 64, and received 66 by the call processor 10. The UDCR code is then compared against a predefined stored code to ascertain correspondence therebetween, and if none is found, program control is taken by default to a destination, as noted in block 68. Such a default destination may include the automatic connection to the switchboard attendant 28, if such a switching system 14 is accompanied by switchboard attendant service facilities. In the alternative, the call processor 10 may simply disconnect the user-programmer in response to the input of an invalid UDCR code. On the other hand, on an affirmative comparison of UDCR codes, the program is branched to block 70 where a voice prompt is retrieved from a voice prompt library in the digital announcement circuit 44, and transmitted to the user-programmer. Such a voice prompt may direct the user-programmer to enter his or her assigned telephone extension number. The extension number is requested as it is necessary to define the telephone set to which the switching system 14 is to respond when processing general routine incoming calls thereto, or when such telephone set is busy or is not answered.

Next, the call processor 10 receives 72 the extension number input by the user-programmer to determine if it is valid. Again, a look-up table 54 resident in the call processor memory can be utilized to list all the valid extension numbers of the switching system 14 according to customer groups, if any, and employed for comparison to determine the validity of an extension number input by the user-programmer.

With regard to program block 72, if it is found that an invalid extension number has been input by the user-programmer, the call processor 10 is routed to block 74 for transmission of a message, such as, "We are sorry, you have input an invalid extension number." The user-programmer is then disconnected 76, whereupon a new preprogramming procedure must be initiated. The call processor 10 of the invention may be programmed to respond to a predefined number of programming attempts which fail, and thereafter remain nonresponsive to further attempts.

If a valid extension number has been input by the user-programmer, program flow is branched to block 78 where another verbal prompt is selected from the digital announcement circuit 44 and transmitted to the user-programmer, instructing the programmer to input his or her assigned security code. According to the invention, the assigned security codes each comprise a particular series of digits which are known respectively only to the individual users. In other words, there is a different and unique security code for each telephone user of the switching system 14. The security codes may be stored in a look-up table 54 and cross-referenced to the digits input according to block 78 to determine correspondence. In the event of the detection of an invalid security code, according to block 80, the call processor control branches back to block 74 where a message is again transmitted indicating the input of an invalid number.

On the detection of a valid security code, program flow branches to block 84 where yet another verbal prompt is transmitted to the user-programmer to solicit an input for programming the call processor 10 as to day or night messages. An exemplary message transmitted may be in the nature of, "Please dial one for day greetings or dial two for night greetings." On the input of the digit one, for example, the call processor 10 proceeds with the programming technique and associated greetings which will be used during daytime hours. As will be described below, the program flow branches back to block 84 for optionally allowing the user-programmer to input the digit two and program the processor 10 to respond to busy and no-answer situations occurring during nighttime hours. It is realized that the call processor 10 can be equipped with realtime clock timers to provide indications as to the time of day.

Upon receipt 86 of the digit indicating day or night messages, the program is directed to block 88 where the user-programmer receives a voice prompt regarding a menu choice. In the preferred form of the invention, the menu choice provides the user-programmer the option of inputting a digit for identifying a choice to program the call processor 10 for responding to general incoming calls, another digit for programming as to busy conditions, and yet another digit for no-answer conditions. The voice prompt mentions such options as well as the particular digits to input for selecting such options.

According to program flow block 90, dual tone multifrequency tones (DTMF tones) are received by the call processor 10 indicating the menu option selected by the user-programmer. The call processor program is branched to one of the noted three routes, depending on whether the user-programmer dialed digits indicating the programming of the system to respond to general calls, busy situations or no-answer situations. In programming the call processor 10 to provide the personal user defined call routing function of the invention, the user-programmer may desire first to program a response to general calls, as indicated by call route 92. The other call routes are identified as 93 and 94. Those skilled in the art may readily realize that other call routes may be defined and utilized within the scope of the invention.

On dialing the digits corresponding to the selection of the general call routing 92, the call processor 10 returns a prompt 96 (FIG. 2b) to the user-programmer soliciting the voice input of a personalized message to be later transmitted to calling parties in response to all general calls to the user's telephone set. The user-programmer may, or have his or her secretary, input a greeting such as, "Thank you, we will connect your call to Mr. Jones." In this example, Mr. Jones is the user-programmer. According to the voice prompt instructions, the user-programmer is also instructed to signify the completion of the text of the greeting by entering a special digit, such as the "#" digit. In this manner, the communication system is signaled when the text of the greeting is completed. According to conventional available voice processing techniques and equipment, the call processor 10 digitizes 98 the voice greeting entered by the user-programmer or the secretary, and stores the same in the recording facility 52 for playback in response to general incoming calls to the particular telephone set. In this manner, whenever a calling party desires to complete a call to Mr. Jones, the calling party is greeted by a personalized message identifying Mr. Jones, the desired destination. The recorded message may be replaced or edited according to the desires of the programmer.

After recording of the user-programmer's personalized greeting, the call processor 10 prompts 100 the user-programmer to define a destination for routing all general calls directed to the user's assigned telephone extension set. Importantly, such a step can be easily modified or changed, depending upon the user-programmer's daily needs. The prompt according to block 100 may instruct the user-programmer to dial a "1" to ring his or her telephone set, dial "2" to direct the telephone call to the voice store and forward facility, or dial "3" to ring another telephone set. Should the user-programmer enter a digit "1" in response to the voice prompt of program block 100, his or her telephone set would be rung in response to all incoming calls, as shown by program flow block 102.

In response to the input of the digit "2" by the user-programmer, the call processor 10 would be programmed to route all incoming calls for connection to the voice store and forward facility 50. In this manner, a calling party desiring to communicate with Mr. Jones would be automatically connected to Mr. Jones' personal voice mailbox of the voice store and forward facility 50 so that a verbal message can be deposited. As shown in program flow block 104, a voice prompt is returned to the user-programmer for entering a voice message which apprises a calling party as to the leaving of a voice message. Such a message may be in the nature of, "Hello, I'm Mike Jones, I'm not presently available, please leave your message at the tone." From block 104, the programming routine branches back to block 84.

On dialing the digit "3" by the user-programmer, the call processor 10 is prepared for routing incoming calls to yet another telephone set or alternate destination. Such other telephone set may comprise the user-programmer's home telephone, his car telephone, his secretary's telephone, another telephone in the office, etc. The call processor 10 then directs a verbal prompt 106 to the user-programmer to input the directory or extension number of the telephone set to which the incoming calls are to be routed. According to block 108, the call processor 10 receives the DTMF signals corresponding to the telephone number input by the programmer, whereupon such signals are decoded by the DTMF receiver 46 and stored in digital form for later retrieval and use.

Program flow is then returned from block 108 back to block 84 where the other of a day or night message may be programmed by the user-programmer.

With reference back to program block 90 (FIG. 2a), the user-programmer may program the call processor 10 to respond to the busy status of his or her telephone set by dialing the digit "2". On receiving such a DTMF input according to block 90, control is branched along a route 93 to program flow block 110 (FIG. 2b), wherein the user-programmer is prompted by the call processor 10 to input a greeting which is relevant to the busy status of the telephone. Such a greeting may comprise, for example, "This is Mr. Jones, I am presently busy. Please dial "1" to hold, dial "2" to reach my secretary, or dial "33 " to stay on line to be connected to a switchboard attendant." According to program block 112, the call processor 10 digitizes and stores the personalized greeting and instructions in the recording facility 52.

Next, the call processor 10 directs a verbal prompt block 114 user-programmer regarding a selection menu for allowing the user-programmer to route the busy status calls to optional destinations. The prompt may be in the nature of advising the user-programmer to dial "2" to define an alternative destination to be rung if a caller, upon reaching a busy signal or situation, does indeed choose the option associated with the digit "2". The user-programmer can dial "3" if a second alternate destination of the incoming call is to be programmed, dial "4" for defining a default destination if no digits are input by the calling party, or dial "5" to exit the programming routine. According to program block 116, the DTMF tones are received in response to the verbal prompt of block 114.

On the receipt of the digit "1" in response to the prompt of program block 114, the call processor 10 is programmed to place all incoming calls confronted with a busy signal, on hold. On the receipt of either of the digits "2" or "3", according to blocks 120 or 122, or on receipt of the digit "4" according to block 124, the corresponding DTMF tones of the associated destinations are received 126 for defining destinations to which the incoming call to the busy telephone set will be transferred. With regard to program block 124, the user-programmer may dial the extension number or other telephone directory number which comprises a default destination. The four optional routes, which can be taken as a result of the outputs of blocks 120-124 all return to block 114 for further programming options. After the programming of the various routes are exhausted, the program branches back to block 84 through the dialing of the digit "5".

No-answer telephone call situations are addressed by programming the branching of the call processor 10 from program block 90, via route 94, to program block 128. Here, the user-programmer programs the call processor 10 concerning the destinations to which it is desired to route incoming telephone calls, in the case the telephone user does not answer his or her telephone set. According to program flow block 128, the call processor 10 prompts the user-programmer to input a voice greeting concerning incoming telephone calls which are not answered. Such a message may constitute the text, "I am sorry, I cannot take your call right now, I am away from my office. Please hold and you will be connected to my secretary." From block 128, the program flow is directed to the input of block 130 and then to block 112, where the same programming procedures are repeated as with the busy situation, except for the hold option. This can be understood as the hold option of a calling party is inappropriate for no-answer situations. In any event, the user-programmer can program the call processor 10 for no-answer situations to route calling parties to alternate destinations, such as in block 120 and 122, or to his or her secretary, or other default destinations.

From the foregoing, disclosed is a technique for controlling a call processor or a communication system for allowing a user to define the particular call routing sequences which may apply to general incoming calls as well as to busy and no-answer situations. Of course, with the foregoing disclosure available, those skilled in the art may extend the call routing options to yet other situations and destinations.

Significantly, a call processor or communication system programmed according to the foregoing provides the capability and flexibility of allowing the telephone user-programmer to specify the particular destinations for connecting the calling parties thereto, depending on the status of the telephone call. Even as important, the telephone user-programmer can change the programming sequence, at will, to provide new destinations, depending on the particular circumstances of the telephone user himself. For example, the telephone user-programmer can program the communication system to route all incoming calls to his or her home, if that is appropriate, or even to a different location if that is where the telephone user intends to be located for a period of time. The capability of a communication system programmed as such, provides powerful options for facilitating the completion of telephone calls so that business transactions can be conducted and completed to the greatest extent possible.

Reference is now made to FIG. 3 for illustrating the functions of the call processor 10 for routing an exemplary incoming call in accordance with the preprogrammed procedure described above. In the event the calling party inputs an extension telephone number, rather than a UDCR code, the program flow branches to program block 140. On receiving and decoding 140 the extension number input by the calling party, program flow is branched further to block 142. Importantly, the call processor 10 is programmed to check each extension number input by the calling party and respond with the appropriate call routes and personalized messages previously programmed in connection with that extension number.

In response to incoming calls to the extension, the general call greeting preprogrammed by the user-programmer according to block 96 is retrieved to inform the calling party that the telephone extension will be rung, unless the predefined routing was established to force all calls to communicate with the voice store and forward facilities, or be directed to another preprogrammed destination. If the call processor 10 was programmed to send all calls to the telephone extension, then the call processor 10 proceeds according to route 146 to ring the extension number previously input by the calling party. On the other hand, if the call processor 10 was programmed to send all calls directed to this telephone extension number to a voice store and forward facility 50, the call processor 10 proceeds via route 148 to prepare a path for transferring the calling party to the voice store and forward facility 50. Generally, the call processor 10 establishes a communication path to the voice store and forward facility 50 by seizing a trunk or other type of telephone line adapted for connection to such facility, automatically dialing digits for accessing the facility, waiting for an answer, and thereafter transmitting further digits to accomplish the completion of a communication path to the voice store and forward facility 50. The connection to a voice store and forward facility is described in more detail in co-pending U.S. Application entitled "Integration of Voice Store and Forward Facility", by Morganstein et al., filed Apr. 17, 1987, Ser. No. 040,564.

With reference back to program flow block 144, route 150 is taken by the call processor 10 if the call processor 10 was preprogrammed to send all calls to an alternate destination. In such event, the call processor 10 outpulses the telephone number previously preprogrammed by the telephone user, thereby connecting the calling party to such alternate destination.

Continuing with telephone call route 146 where the call will be routed to the extension, the telephone extension digit number input is either transferred to the PBX if such a switching system is not integrated therewith, or where integrated, directly rings the telephone set associated with the extension number. If the called party (Mr. Jones) answers the call, as noted by block 152, a communication path is established between the calling party and Mr. Jones' telephone set, whereupon the parties are placed in communication, as shown in block 154.

In the event that the telephone set associated with the extension number is busy 156, the telephone user's personalized greeting which is pertinent to the busy situation is transmitted to the calling party, as shown by program block 158. Busy signals can be sensed by equipment well known in the art. In response to such greeting, the call processor 10 receives 160 the digits input by the calling party for corresponding processing. If the calling party desires to be placed on hold (dialed "1") as depicted in block 162, the call processor 10 will periodically scan or access the telephone line associated with the telephone set to determine if a busy condition still exists. In nonintegrated communication systems, the system may release the line to the PBX and periodically reseize such line and redial the extension number to determine if the busy condition still exists. An appropriate interim message may be transmitted to the calling party indicating the busy situation and that attempts are still being made to reach the extension telephone.

In the event the calling party has input the digit "2", the call processor 10 proceeds according to block 164 to output the telephone number or otherwise establish a communication path to the first alternate destination. Similarly, if the digit "3" was input by the calling party, the call processor 10 proceeds in establishing a communication path to the second alternate preprogrammed destination block 166. However, if the calling party inputs no digits, the program flow proceeds to block 168, wherein the calling party is connected to a preprogrammed default destination. As noted above, the default destination may be a secretary, or an attendant 28 associated with the switching system 14.

With reference back to call route 144, if the call processor 10 finds that the called telephone set continues to ring, such situation is indicative of a no-answer status 170. The detection of multiple ring sequences can be sensed by equipment well known in the art. After a predetermined number of rings, such as six or seven ringing sequences, the call processor 10 proceeds to program flow block 172, whereby the preprogrammed no-answer greeting is transmitted to the calling party. In response to the no-answer greeting, the calling party may respond by dialing the appropriate digits to be automatically transferred to a first or second preprogrammed alternate destination. On the failure to input digits, the calling party is routed to block 168 where program instructions are executed to connect the calling party to the preprogrammed default destination.

The input of the digits "2" or "3" by the calling party as a result of the greeting of the programmed instructions of block 128, control blocks 174 or 176. The calling party is henceforth connected to the voice messaging facility 50, or to the alternate destination, both of which have been preprogrammed as options by the telephone user-programmer of the call processor 10.

It can be appreciated that a technical advantage presented by the invention is that a called party can program a communication system to route calls in a personalized manner so that the communication of information is enhanced. A related technical advantage of the invention is that a user-programmer of the communication system can preprogram routes to predetermined destinations in response to busy and no-answer conditions of his or her telephone, while yet giving the calling party options which are best suited under the conditions in completing the call. Indeed, the user-programmer can preprogram a call route to a destination based upon an anticipated location at which the user-programmer intends to temporarily reside, and may inform the caller that such a transfer will occur, for example, the caller may receive a message such as, "Hello, this is Mr. Jones, I'm in my car now, and if you will wait a moment, I'll take your call there."

While the preferred embodiment of the invention has been disclosed with reference to a specific user-defined calling routing scheme, it is to be understood that many changes in detail may be made as a matter of engineering choices without departing from the spirit and scope of the invention, as defined by the appended claims.

What is claimed is:

1. A method for providing personalized routing of telephone calls in a telecommunication system, comprising the steps of:
   receiving information from a programmer of the system defining a programming mode;
   transmitting an instructional message to the programmer soliciting the input of information regarding at least one alternative destination information to be used when an intended called party is busy; and
   receiving information from the programmer indicating at least one destination for routing incoming telephone calls in response to said busy condition, said destination selected by the programmer from destination including real-time destinations other than the programmer.

2. The method of claim 1, further including transmitting an instructional message to the programmer soliciting the input of a greeting for general telephone calls and receiving information from the programmer indicating destination information for routing incoming telephone calls according to the general call greeting.

3. The method of claim 1, and further comprising the steps of:
   transmitting an instructional message to the programmer soliciting the input of second alternative destination information to be used when an intended called party does not answer; and
   receiving information from the programmer indicating at least one destination for routing incoming telephone calls in response to the called party not answering, the destination selected from destinations including real-time destinations other than the called party.

4. The method of claim 3, further including storing a greeting received from the programmer for transmission to a calling party in response to a busy condition, and storing the greeting for subsequent transmission to the calling party in response to a no-answer condition.

5. The method of claim 3, further including storing a voice instruction received from the programmer for subsequent transmission to a calling party for directing the calling party to input information for selecting a destination in response to the no-answer condition.

6. The method of claim 1, further including storing voice information received from the programmer for transmission to a calling party which identifies the called party and signifies that the call is being connected to the called party.

7. The method of claim 1, further including storing a voice instruction received from the programmer for subsequent transmission to a calling party for directing the calling party to input information for selecting a destination in response to the busy condition.

8. The method of claim 1, further including programming different instructional messages for transmission to the calling party, depending on the time of day.

9. The method of claim 1, further including receiving from the programmer digit information indicating plural destinations selectable by a calling party in response to the busy condition.

10. A telecommunication system for carrying out the steps of claim 1.

11. A method for providing personalized routing of telephone calls in a telecommunication system, comprising the steps of:
    storing in the telecommunication system a programming mode for allowing a person to individually program said system to complete calls according to individual desires, said programming including:
    storing a security code which is unique to users of the telecommunication system;
    correlating the security code with the user's telephone extension number to verify authority to program a routing of calls initially directed to a telephone set;
    storing a personalized voice message unique to each said user to be later transmitted to a respective calling party; and
    storing instruction information from each user regarding a destination with which a calling party can be connected if communications cannot then be established with the respective users.

12. The method of claim 11, further including storing destination information related to busy and no-answer conditions of the users.

13. The method of claim 12, further including detecting a busy condition of a user and in response thereto transmitting to the calling party said personalized voice message relating to said busy condition and instructing the calling party of the selection of optional destinations.

14. The method of claim 13, further including receiving digit information from the calling party regarding said optional destinations and connecting the calling party to the selected destination.

15. The method of claim 11, further including detecting a no-answer condition of a user and in response thereto transmitting to said calling party said personalized voice message relating to said no-answer condition and instructing the calling party of the selection of an optional destination.

16. The method of claim 15, further including receiving digit information of said optional destination and connecting the calling party to the selected destination.

17. Apparatus for providing personalized routing of a telephone call in accordance with the method of claim 1.

18. A method for providing personalized routing of telephone calls in a telecommunication system, comprising the steps of:

receiving information from a programmer of the system defining a programming mode;

receiving information from the programmer defining a telephone extension for which programming is to be associated;

transmitting an instructional message to the programmer soliciting the input of a personalized greeting uniquely associated with said telephone extension for subsequent transmission to calling parties desiring to communicate to the telephone extension; and receiving information from the programmer indicating destination information for programming a call route to direct incoming telephone calls to a desired destination, said incoming telephone calls to a desired destination, said destination selectable by the programmer from a plurality of destinations including real-time destinations other than the first and telephone extension.

19. The method of claim 18, further including the step of receiving and storing voice test information from said programmer in response to said instructional message which test identifies by name a person associated with the first said telephone extension.

20. The method of claim 18, further including programming the telecommunication system to respond to all incoming calls directed to the first said telephone extension in a manner particularly programmed for such extension.

21. The method of claim 20, further including receiving from calling parties telephone extension digits, and directing call processing of the telecommunication system according to a route programmed for such telephone extension.

22. A telecommunication system for carrying out the steps of claim 18.

23. A method for providing personalized routing of telephone calls in a telecommunication system, comprising the steps of:

storing a first voice greeting of a telephone user concerning a busy status of the user's telephone, and voice instructions regarding a manner in which to reach a first alternate destination programmably selected by the user from destinations including real-time destination other than the user's telephone;

storing destination information input by the telephone user for defining said first alternate destination;

storing a second voice greeting of a telephone user concerning a no-answer status of the user's telephone and voice instructions regarding the manner in which to read a second alternate destination programmably selected by the user from destinations including real-time destinations other than the user's telephone;

storing destination information input by the telephone user for defining said second alternate destination;

detecting a busy telephone status and in response thereto transmitting said first voice greeting to a calling party, and connecting the calling party to the first alternate destination; and detecting a no-answer telephone status and in response thereto transmitting said second voice greeting to a calling party, and connecting the calling party to the second alternate destination.

24. The method of claim 23, further including storing voice instructions for transmission to the calling party regarding multiple alternate first destinations, and receiving from the calling party a selected one said alternate destination of said multiple and connecting the calling party to the selected alternate destination.

25. The method of claim 23, further including storing voice instructions for transmission to the calling party regarding multiple second alternate destinations, and receiving from the calling party a selected one said alternate second destination of said multiple and connecting the calling party to the selected second alternate destination.

26. The method of claim 23, further including storing a programming mode indicator, and receiving from a telephone user a programming mode code, and comparing the stored programming mode indicator with the received programming mode code to determine correspondence therebetween.

27. The method of claim 23, further including storing a security code unique to each telephone user of said telecommunication system, and comparing a security code input by a telephone user desiring to program said telecommunication system.

28. The method of claim 27, further including comparing the security code input by the user with a stored security code for correspondence therebetween.

29. A telecommunication system for carrying out the steps of claim 23.

30. Apparatus for providing personalized routing of telephone calls in a telecommunications system, comprising:

means for receiving information from a programmer of the system defining a programming mode;

means for receiving information from the programmer defining a telephone extension for which programming is to be associated;

means for transmitting an instructional message to the programmer soliciting the input of a personalized greeting for subsequent transmission to calling parties desiring to communicate to the telephone extension; and means for receiving information from the programmer indicating destination information for programming a call route to direct incoming telephone calls to a desired destination, said desired destination programmably selected by the programmer for a plurality of destinations including real-time destinations other than said telephone extension.

31. The apparatus of claim 30, further including means for receiving and storing voice text from said programmer which identifies by name a person associated with the telephone extension.

32. The apparatus of claim 30, further including means for programming the telecommunication system to respond to all incoming calls directed to the telephone extension in a manner particularly programmed for such extension.

33. The apparatus of claim 32, further including means for receiving from calling parties telephone extension digits, and directing call processing of the telecommunication system according to a route programmed for such telephone extension 34. A telecommunications system programmable by a user having an extension for routing telephone calls in a personalized manner, comprising:
- a memory for storing a first voice greeting of the telephone user concerning a telephone busy status, and for storing voice instructions instructing a calling party as to the manner in reaching a first alternate destination;
- a memory for storing destination information input by the telephone user for defining a first alternate destination, said first alternate destination selected by the user from a plurality of destination including real-time destinations other than the user's extension;
- a memory for storing a second voice greeting of a telephone user concerning a telephone no-answer status and for storing voice instructions instructing a calling party as to the manner in reaching a second alternate destination;
- a memory for storing destination information input by the telephone user for defining said second alternate destination;
- a detector for detecting a busy telephone status;
- a transmitter for transmitting said first voice greeting to the calling party in response to the busy telephone status;
- means for connecting the calling party to the first alternate destination;
- a detector for detecting a no-answer telephone status;
- a transmitter for transmitting said second voice greeting to the calling party in response to the no-answer status; and
- means for connecting the calling party to the second alternate destination.

35. The telecommunication system of claim 34, further including a memory for storing voice instructions regarding multiple first alternate destinations, a receiver for receiving from the calling party a selected one said alternate destination of said multiple, and means for connecting the calling party to the selected first alternate destination.

36. The telecommunication system of claim 34, further including means for storing voice instructions regarding multiple second alternate destinations, a receiver for receiving from the calling party a selected one said alternate second destination of said multiple, and means for connecting the calling party to the selected second alternate destination.

37. The telecommunication system of claim 34, further including a programming mode selectable by telephone users of said telecommunication system for allowing personalized programming thereof.

38. The telecommunication system of claim 34, further including means for storing a security code assigned to each telephone user of the telecommunication system, and means for comparing a security code input by the user with a telephone extension number assigned to the user.

39. The telecommunication system of claim 34, wherein said second alternate destination is personal and dependent upon prior selectable programming by the user from a plurality of destinations including real-time destinations.

40. A method for providing personalized routing of telephone calls in a telecommunication system, comprising the steps of:
- receiving information from a programmer of the system defining a programming mode;
- transmitting an instructional message to the programmer soliciting the input of information regarding at least one alternative destination to be used when an intended called party does not answer; and
- receiving information from the programmer indicating at least one destination for routing incoming telephone calls in response to the called party not answering said destination selected by the programmer from destinations including real-time destinations other than the programmer.

41. The method of claim 40, further including transmitting an instructional message to the programmer soliciting the input of a greeting for general telephone calls, and receiving information from the programmer indicating destination information for routing incoming telephone calls according to the general call greeting.

42. The method of claim 40, further including storing voice information received from the programmer for transmission to a calling party which identifies the called party and signifies that the call is being connected to the called party.

43. The method of claim 40, further including programming different instructional messages for transmission to the calling party, depending on the time of day.

44. A telecommunication system for carrying out the steps of claim 40.

45. The method of claim 40, further including receiving from the programmer digit information indicating plural destinations selectable by a calling party in response to the no-answer condition.

* * * * *

UNITED STATES PATENT AND TRADEMARK OFFICE
CERTIFICATE OF CORRECTION

PATENT NO. : 5,027,384

DATED : June 25, 1991

INVENTOR(S) : Sanford J. Morganstein

It is certified that error appears in the above-identified patent and that said Letters Patent is hereby corrected as shown below:

Title page, item [57] Abstract, col. 2, line 13 change "circumstance" to --circumstances--.

Column 8, line 21, change "33" to --3--.

Column 13, claim 18, line 38, change "and" to --said--.

Column 13, claim 19, line 40, change "test" to --text--.

Column 13, claim 19, line 42, change "test" to --text--.

Column 14, claim 23, line 4, change "read" to --reach--.

Column 14, claim 30, line 67, change "for" to --from--.

Column 15, claim 34, line 26, change "destination" to --destinations--.

Signed and Sealed this

Ninth Day of November, 1993

*Attest:*

BRUCE LEHMAN

*Attesting Officer*     *Commissioner of Patents and Trademarks*